H. & J. SANGSTER.

Lantern.

No. 325. Reissued Aug. 21, 1855.

Witnesses:

Thos P. Howe.
Mary E. Bagg.

Inventor:

Hugh Sangster
James Sangster.

N. PETERS, Photo-Lithographer, Washington, D. C.

UNITED STATES PATENT OFFICE.

HUGH SANGSTER AND JAMES SANGSTER, OF BUFFALO, NEW YORK.

IMPROVEMENT IN LANTERNS.

Specification forming part of Letters Patent No. 8,154, dated June 10, 1851; Reissue No. 325, dated August 21, 1855.

*To all whom it may concern:*

Be it known that we, HUGH SANGSTER and JAMES SANGSTER, of Buffalo, in the county of Erie and State of New York, have invented a new and Improved Mode of Constructing Lanterns, which we have described in the following specification and illustrated in the accompanying drawings with sufficient clearness to enable others of competent skill to make and use our invention.

Our invention consists in improvements which facilitate very greatly the attachment and detachment of the lamp to and from the lantern, said improvements being a combination of flanges and spring-catches so arranged that the lamp may be connected to the lantern by pressing the lantern down upon it, while at the same time the catches are so arranged in connection with other parts of the lantern, and the other parts in connection with the catches, that they do not interfere with setting the lantern or the lamp down upon a plane surface, and yet the catches placed in such a position and constructed in such a manner that they may be conveniently taken hold of and operated with facility, as hereinafter more definitely described and set forth.

Figure 1:
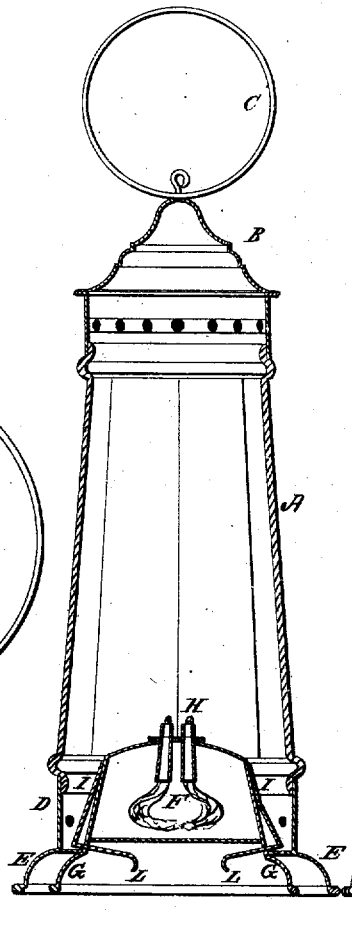
Figure 2:
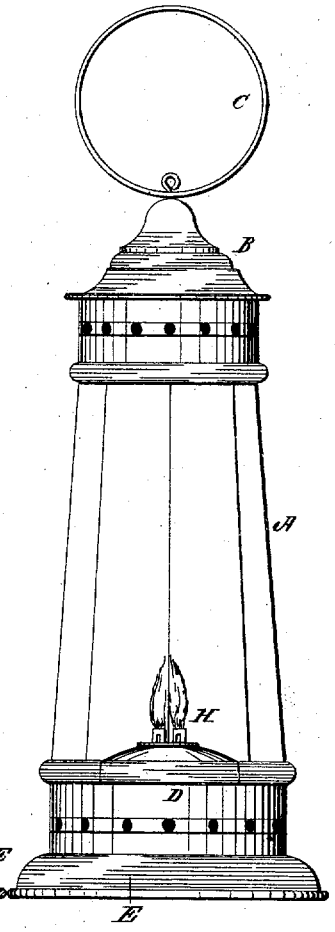
Figure 3:
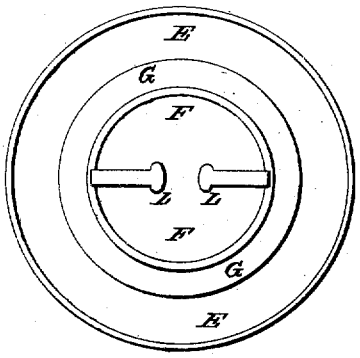

In the accompanying drawings, Figure 1 is vertical projection of the lantern with the lamp in it. Fig. 2 is a vertical projection of the parts back of the center of the lamp and lantern. Fig. 3 is a bottom view or plan of the lamp turned over.

A is the glass; B, the cap, and C the ring or bail by which the lantern is carried. The bottom of the glass is set in the ring D, which incloses the lamp F. The ring D has a circular flange, E, upon it at its base, which flange projects both outward and inward from the ring D, and is made in the form represented in the drawings to allow the lamp to pass completely within it, so that the lantern when set upon a plane surface will rest upon this flange, and not entirely, if at all, upon the lamp. The lamp is inserted from below through the circular opening in the flange E, and passes into the lantern until another circular flange, G, projecting outward from the base of the lamp, strikes the flange E. Two springs, I, made of thin elastic metal, (usually sheet spring brass,) are riveted or soldered to the sides of the lamp near the top of it, and the sides of the lamp pass below the bottom of the oil-chamber sufficiently far to allow the springs I, bent as shown in Fig. 2, to pass through them above the flange G, and have sufficient room to work freely between the flange G and the bottom of the oil-chamber. The springs I are bent (as will be seen by an inspection of the drawings) in such a manner as to form an elbow that will catch over the flange E when the lamp is pressed into the lantern, and terminate in a thumb-piece, L, by which the catches are taken hold of to operate them to disengage the lamp.

We do not claim fastening lamps to lanterns by spring-catches, nor do we claim attaching said catches to the upper part of the lamp and extending them down so as to spring outward over a flange in the lantern; but

We claim as our invention and desire to secure by Letters Patent—

1. Constructing and arranging the spring-catches I in the manner described, or its equivalent, to cause the attachment of the lamp to the lantern by the operation of pressing the lantern down upon the spring-catches.

2. Arranging the thumb-pieces L within the flange G at the base of the lamp by extending the springs I toward each other horizontally, as described, and thus forming the elbow-catch to rest against the shoulder on the flange E of the lantern, in the manner and for the purposes specified.

HUGH SANGSTER.
JAMES SANGSTER.

Witnesses:
THOS. P. HOW,
MARY E. BAGG.